United States Patent [19]

Bryan

[11] Patent Number: 5,243,635
[45] Date of Patent: Sep. 7, 1993

[54] FUEL ROD CAPTURING GRID SPRING AND ARCH

[75] Inventor: William J. Bryan, Granby, Conn.

[73] Assignee: Combustion Engineering, Inc., Windsor, Conn.

[21] Appl. No.: 950,681

[22] Filed: Sep. 25, 1992

[51] Int. Cl.⁵ ............................................. G21C 3/34
[52] U.S. Cl. .................................. 376/442; 376/462
[58] Field of Search ............... 376/442, 462, 352, 438, 376/441

[56] References Cited

U.S. PATENT DOCUMENTS 4,570,703  2/1986  Ringsmuth et al. ............... 376/462

Primary Examiner—Donald P. Walsh
Assistant Examiner—Frederick H. Voss
Attorney, Agent, or Firm—Ronald P. Kananen; John H. Mulholland

[57] ABSTRACT

A fuel rod capturing support grid having a spring and arch design which provides performance improvements over current or previous designs by decreasing fuel rod fretting wear. The disclosed spring and arch designs follow the contour of the fuel rod, thus providing an increased, substantially arc-shaped area of contact between the fuel rod and the spring tabs and arches.

2 Claims, 3 Drawing Sheets

FUEL ROD CAPTURING GRID SPRING AND ARCH

FIELD OF THE INVENTION

The invention described herein relates to support grids for fuel rods in nuclear reactor fuel assemblies. More particularly, this invention relates to support grids having spring tabs and arches which are designed to provide increased contact area relative to the fuel rod.

BACKGROUND OF THE INVENTION

Commercial nuclear reactors used for generating electric power include a core composed of a plurality of fuel assemblies which generate heat used for electric power generation purposes. Each fuel assembly includes an array of fuel rods and control rod guide tubes held in spaced relationship with each other by grids of egg-crate configuration spaced along the fuel assembly length. The fuel rods may be approximately 0.5 inches in diameter and about 12 feet long, thus requiring a number of support grids along their length. Each grid includes a plurality of interwoven Inconel or Zircaloy straps which are vertically stacked to form multiple cells, with each cell having springs on two adjacent walls and projections, such as arches, on each of the other two adjacent opposing walls. The springs impose lateral forces on each fuel rod in the assembly, pressing the fuel rods into contact with the opposing arches. Although this fuel assembly design performs exceptionally well in a nuclear reactor, one disadvantage inherent in this design is that the inwardly projecting springs and arches cause fuel rod fretting wear at the contact points between the fuel rods and the support grid springs and arches.

Fuel rod fretting wear is an important design consideration for pressurized water reactor (PWR) steam generators. Fuel rod wear results from fluid-flow-induced fuel-rod vibration and from the existence of clearances, or gaps, between the fuel rods and the fuel rod supports. Such gaps are either initially present or form during reactor operation. If fuel rod vibration is excessive in duration and intensity, wear can result in unacceptable fuel rod wall material loss and fatigue cracking, leading to fuel rod failure.

SUMMARY OF THE INVENTION

In view of the foregoing, it is apparent that prior art support grid designs are susceptible to fuel rod failure due to fretting wear. One advantage of the support grids of the present invention is a reduction in the likelihood of fuel rod failure as compared to prior-art support-grid designs.

This and other advantages have been achieved by the construction of support grids having enhanced contact area with the fuel rods contained therein.

For example, according to an embodiment of the present invention, a support grid for use in a nuclear reactor fuel assembly is described which includes a plurality of intersecting straps that form openings for receiving, supporting and spacing a plurality of nuclear fuel rods. The support grid also includes a plurality of spring tabs biased into the openings, for applying lateral forces against the fuel rods, and a plurality of arches projecting into the openings, for providing lateral support for the fuel rods. Both the spring tabs and the arches have contours corresponding to a portion of the circumference of the fuel rods to provide substantially arc-shaped regions of contact between the fuel rods and the tab springs and arches.

Upon study of the specification and appended claims, further advantages of this invention will become apparent to those skilled in the art.

DETAILED DESCRIPTION OF THE INVENTION

Figure 1:
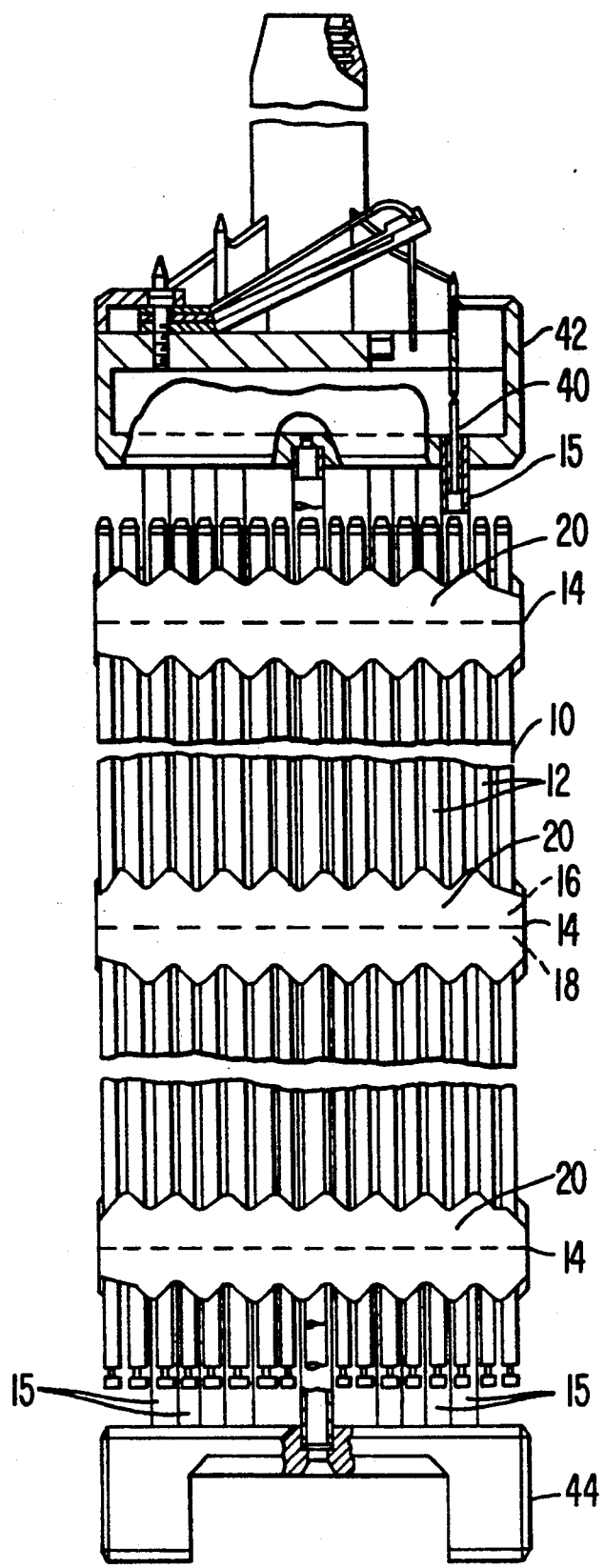
FIG. 1 is a schematic elevational view illustrating a fuel assembly according to an embodiment of the present invention.

Referring now to the drawings, there is shown in FIG. 1 a nuclear reactor fuel assembly 10 comprising an array of fuel rods 12 held in spaced relationship with each other by support grids 14a spaced along the fuel assembly length. Each grid includes a peripheral strap 20.

In assembling a fuel assembly, an array of control rod guide tubes 15 having control rods 40 adapted for slidable longitudinal movement therein, are positioned to extend axially through selected cells in the grid and are thereupon welded to grid tabs or strap walls to form the fuel assembly skeleton structure. Opposite ends of the guide tubes are attached to top and bottom nozzles 42, 44 in the usual manner.

Figure 2:
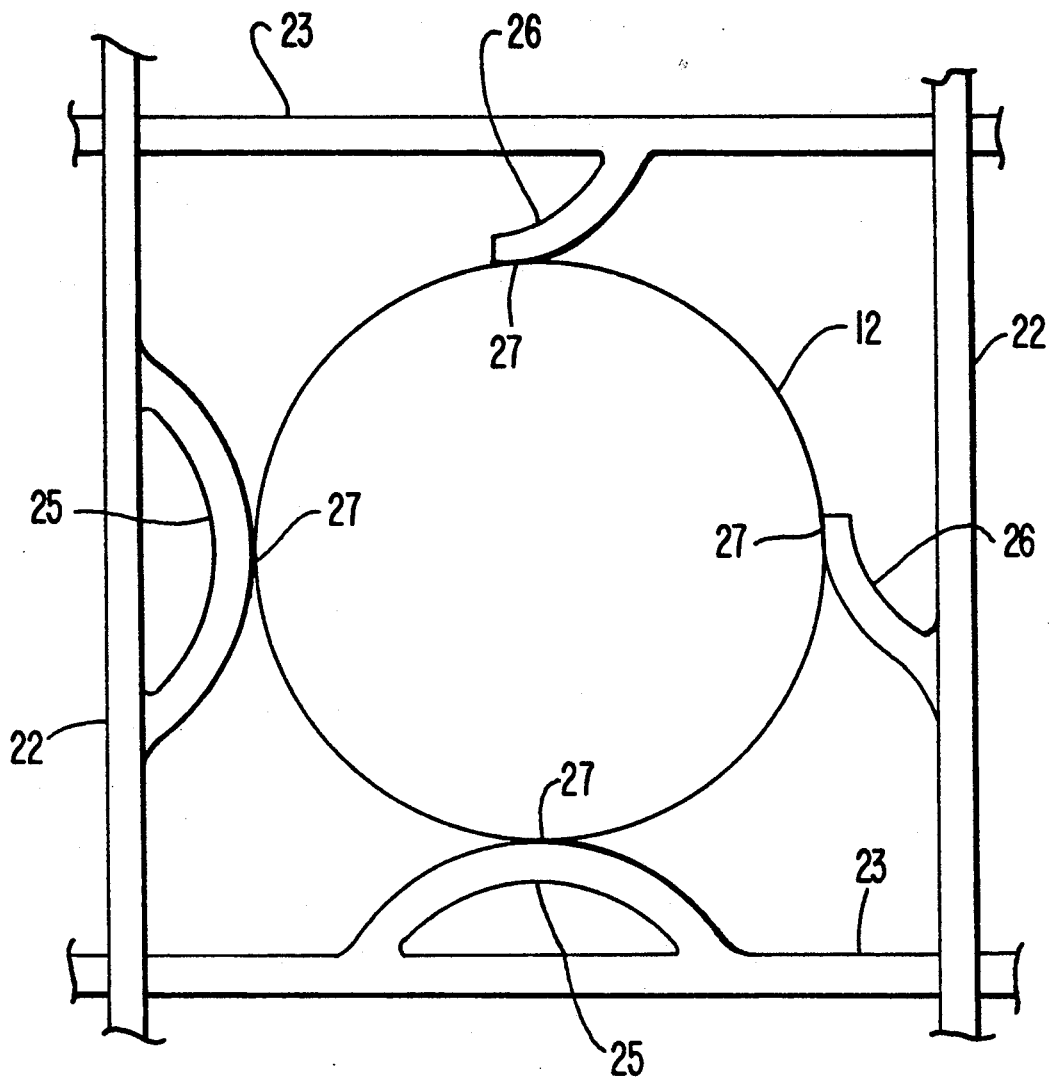
FIG. 2 is a plan view of a portion of a support grid according to the prior art, illustrating the relationship of the fuel rods with respect to the springs and arches of the support grid.

Referring now to the portion of the prior-art support grid 14 shown in FIG. 2, upper and lower straps 22, 23 made of Zircaloy, Inconel or other material are interwoven to form grid sections of egg-crate configuration. The three support grids 14 shown in FIG. 1 are vertically aligned such that the square-shaped openings 24 formed by the interwoven straps 22, 23 are likewise vertically aligned to form cells that are of a size sufficient to receive fuel rods 12 or control rod guide tubes. Each square-shaped opening 24 designated to receive a fuel rod 12 has a pair of arches 25 on two adjacent sides and a pair of spring tabs 26 on the remaining opposing adjacent sides. The cells formed from the vertically-aligned square-shaped openings 24 within the support grids 14 thus contain adjacent, vertically aligned columns of arches 25 and spring tabs 26 which are disposed for contact with the fuel rods 12. Note that only lines of contact 27 are formed between the fuel rods 12 and the arches 25 and spring tabs 26.

Figure 3:
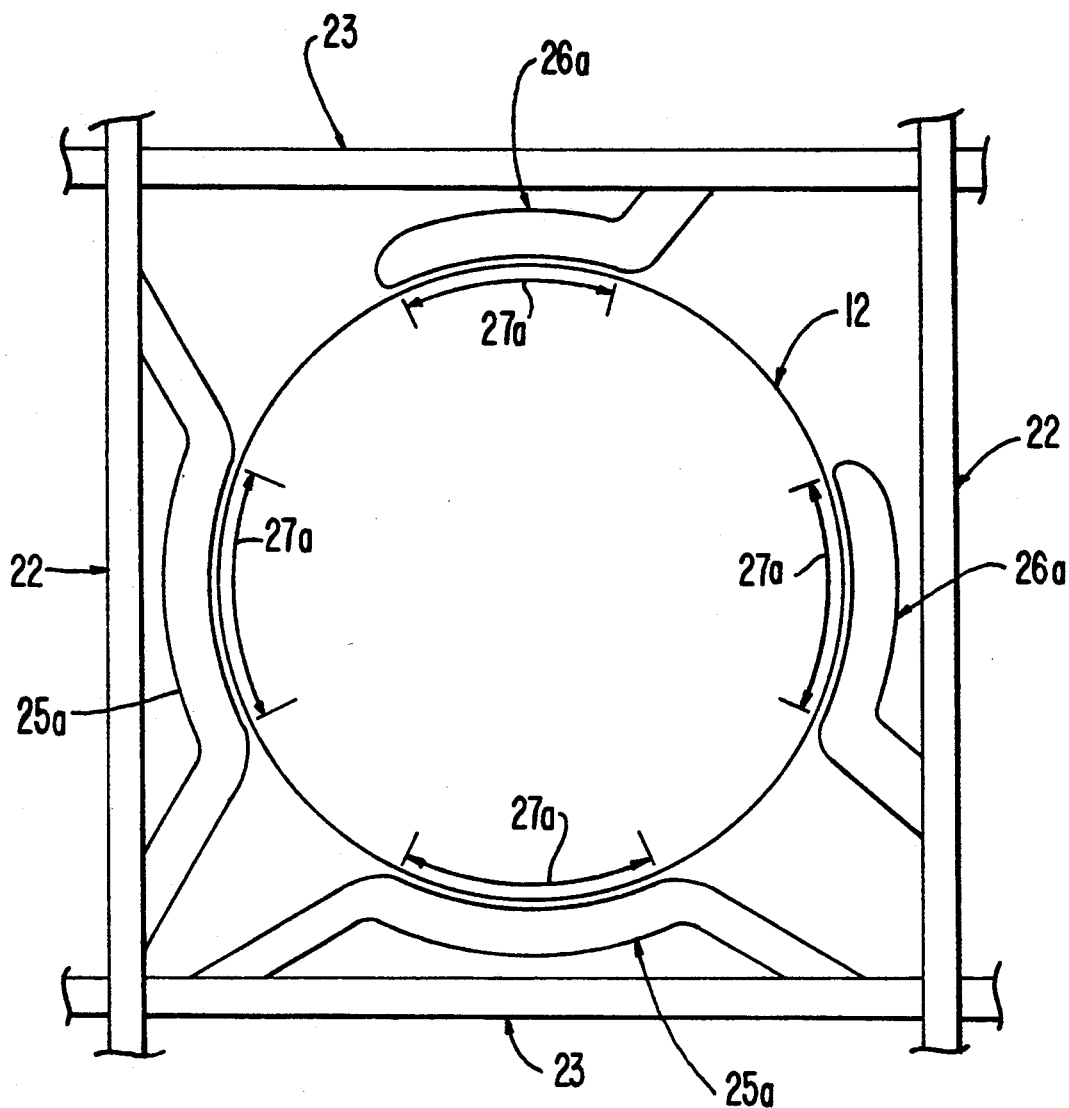
FIG. 3 is a plan view of a portion of a support grid according to an embodiment of the present invention, illustrating the relationship of the fuel rods with respect to the spring tabs and arches of the support grid.

FIG. 3 illustrates a portion of a support grid 14 which is designed in accordance with an embodiment of the present invention. As can be seen from FIG. 3, this improved support grid 14 is equipped with improved spring tabs 26a and arches 25a which follow the contour of the circumference of the fuel rod 12, thereby providing substantially arc-shaped areas of contact 27a between the fuel rod 12 and the arches 25a and spring tabs 26a. Obviously, contact area can be further increased by further increasing the length of the arc along which the arches 25a and spring tabs 26a follow the circumference of the fuel rod and by increasing the width (i.e., the dimension normal to the paper in FIG. 3) of the arches 25a and spring tabs 26a.

Previously published research indicates that metal wear (as measured by material volume removed) is proportional to load, with the area of metal contact essentially having no effect on the material volume removed. See. Archard, J. F., and Hirst, W., "The Wear of Metals Under Unlubricated conditions", *Proc. Royal Society (London)*, Vol. 236A, pp. 397-410 (1956). Thus, by holding the contact force between the fuel rod 12 and the support grid 14 approximately constant and by increasing the contact area over which the material will be removed, the depth of any fuel rod fretting wear will be reduced since the wear is distributed over a larger area.

Moreover, when gaps arise between the fuel rod 12 and arches 25a and spring tabs 26a (e.g., due to interactions between the fuel rod 12 and support grid 14 under reactor operation conditions) the contoured shape of the support grid arches 25a and spring tabs 26a will dampen destructive vibrations between the fuel rod 12 and arches 25a and spring tabs 26a due to the enhancement of squeeze film effects between these elements. By dampening vibrations, impact loads are lessened and fuel rod 12 wear is reduced. Squeeze film behavior is characterized by a large buildup of force which occurs just prior to impact and which acts in a direction to reduce the impact. Research in this area, based on tube vibrations within an annular support, indicates that the increase in damping due to the squeeze film effect increases with the velocity of the vibration. Such damping should also increase with increasing the area of contact on impact, as suggested by the observation of a decrease in squeeze film effects upon tube canting (which causes point contact, rather than line contact) and by an increase in squeeze film effect with the length of contact area (i.e., support "thickness"). See, Haslinger, K. H., and Martin, M. L., "Experimental Characterization of Fluid and Squeeze Film Effects in Heat Exchanger Tube Supports", *Journal of Fluids and Structures*, Vol. 4, pp. 605-629 (1990).

Finally, the contoured shape of the arches 25a and spring tabs 26a provides additional resistive force during lateral loading (e.g., effects due to seismic activity, LOCA, operating, shipping, and so forth). This is due to the fact that, as the fuel rod 12 moves laterally, the spring tabs 26a deflect a greater distance due to their contoured shapes, producing larger relative forces.

Of course, in using contoured arches 25a and spring tabs 26a such as those shown in FIG. 3, assembly considerations such as potential mixing vane interferences should be taken into consideration. Fortunately, spacer grid assembly fixtures are available which have mixing vanes that can be held out of the way during assembly so that such interferences will not exist.

Thus, a support grid 14 for a nuclear reactor fuel assembly 10 has been described which includes contoured spring tabs 25a and arches 26a for increased contact area with nuclear fuel rods 12. Such increased contact area is provided to remove fuel rod fretting and to increase resistive forces during lateral loading.

From the foregoing description, one skilled in the art can easily ascertain the essential characteristics of this invention, and without departing from the spirit and scope thereof, can make various changes and modifications of the invention to adapt it to various usages and conditions.

I claim:

1. A support grid for holding a plurality of fuel rods in a spaced relationship with each other in a nuclear reactor fuel assembly comprising:

a plurality of straps interwoven at right angles to each other to form multiple openings of square configuration which are designated to receive a plurality of fuel rods;

a pair of arches projecting inwardly from adjacent walls of each of said multiple openings of square configuration, said arches having contours corresponding to substantially arc-shaped portion of the circumference of said fuel rods to provide substantially arc-shaped regions of contact between said spring tabs and said fuel rods; and a pair of spring tabs projecting inwardly from adjacent walls of each of said multiple openings of square configuration, said spring tabs having contours corresponding to substantially arc-shaped portions of the circumference of said fuel rods to provide a substantially arc-shaped regions of contact between said arches and said fuel rods.

2. A support grid for use in a nuclear reactor fuel assembly comprising:

a plurality of intersecting straps forming openings for receiving, supporting and spacing a plurality of nuclear fuel rods;

a plurality of spring tabs biased into said openings for applying lateral forces against said fuel rods, said spring tabs having contours corresponding to substantially arc-shaped portions of the circumference of said fuel rods to provide substantially arc-shaped regions of contact between said spring tabs and said fuel rods; and a plurality of arches projecting into said openings for providing lateral support for said fuel rods, said arches having contours corresponding to substantially arc-shaped portions of the circumference of said fuel rods to provide a substantially arc-shaped regions of contact between said arches and said fuel rods.

* * * * *